(12) United States Patent
Inagaki et al.

(10) Patent No.: US 10,112,459 B2
(45) Date of Patent: Oct. 30, 2018

(54) REGISTER

(71) Applicants: HOWA PLASTICS CO., LTD., Toyota-shi (JP); TOYOTA JIDOSHA KABUSHIKI KAISHA, Toyota-shi (JP)

(72) Inventors: Noriyuki Inagaki, Toyota (JP); Kunio Nakamura, Nagoya (JP); Masahito Yabuoshi, Chiryu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 731 days.

(21) Appl. No.: 14/419,132

(22) PCT Filed: Aug. 2, 2013

(86) PCT No.: PCT/JP2013/070977
§ 371 (c)(1),
(2) Date: Feb. 2, 2015

(87) PCT Pub. No.: WO2014/024788
PCT Pub. Date: Feb. 13, 2014

(65) Prior Publication Data
US 2015/0202946 A1 Jul. 23, 2015

(30) Foreign Application Priority Data

Aug. 8, 2012 (JP) .................................. 2012-176281

(51) Int. Cl.
*B60H 1/34* (2006.01)
*F24F 13/065* (2006.01)
(52) U.S. Cl.
CPC ......... *B60H 1/3442* (2013.01); *B60H 1/3428* (2013.01); *F24F 13/065* (2013.01)

(58) Field of Classification Search
CPC .. B60H 1/3428; B60H 1/3442; B60H 2/3428; F24F 13/065
(Continued)

(56) References Cited

U.S. PATENT DOCUMENTS 2,996,970 A * 8/1961 Goettl .................... F24F 13/15
454/314
3,835,759 A * 9/1974 Lloyd .................. B60H 1/3442
251/352

(Continued)

FOREIGN PATENT DOCUMENTS

CN 102498005 A 6/2012
DE 197 01 499 C1 12/1997
(Continued)

OTHER PUBLICATIONS

Extended European Search Report dated Dec. 10, 2015 in Patent Application 13827167.1.
(Continued)

*Primary Examiner* — Gregory Huson
*Assistant Examiner* — Frances F Hamilton
(74) *Attorney, Agent, or Firm* — Oblon, McClelland, Maier & Neustadt, L.L.P.

(57) ABSTRACT

On a centerline parallel to an air blowing direction inside a retainer, a ball joint with a ball is disposed. On a turning louver, a central axial support portion from which axial support portions are projected radially is disposed at the center of a cylindrical frame. The central axial support portion is attached tiltably and turnably by fitting a ball hole provided at the center with the ball. Inside the cylindrical frame, movable fins are axially supported turnably at substantially even intervals by pivots in radial directions, and the inner-side portions of each movable fin are axially supported by each axial support portion. To the front surface
(Continued)

side center of the central axial support portion, an operation portion is fitted turnably around the centerline of the turning louver, and the operation portion is linked to the inner-side portions of each movable fin via a bevel gear mechanism.

6 Claims, 17 Drawing Sheets

(58) Field of Classification Search
 USPC ........................................................ 454/154
 See application file for complete search history.

(56) References Cited

U.S. PATENT DOCUMENTS

| | | | | |
|---|---|---|---|---|
| 4,006,673 | A * | 2/1977 | Meyer | B60H 1/3442 251/352 |
| 4,702,155 | A * | 10/1987 | Hildebrand | B60H 1/3435 454/155 |
| 6,533,655 | B2 * | 3/2003 | Demerath | B60H 1/3421 454/155 |
| 7,288,023 | B2 * | 10/2007 | Leopold | B60H 1/3442 239/539 |
| 8,740,677 | B2 * | 6/2014 | Steinbeiss | B60H 1/3442 454/152 |
| 9,341,386 | B2 * | 5/2016 | Brinas | B60H 1/3414 |
| 2004/0063397 | A1 * | 4/2004 | Dippel | B60H 1/3407 454/154 |

FOREIGN PATENT DOCUMENTS

| | | | | |
|---|---|---|---|---|
| DE | 299 14 962 U1 | 10/1999 | | |
| DE | 10 2009 009 241 A1 | 8/2010 | | |
| EP | 2 477 828 B1 | 11/2013 | | |
| FR | 2 792 256 A1 | 10/2000 | | |
| JP | 60 184713 | 12/1985 | | |
| JP | 61 217643 | 9/1986 | | |
| JP | 63 196038 | 12/1988 | | |
| JP | 3 27237 | 6/1991 | | |
| JP | 6 53220 | 7/1994 | | |
| JP | 6 55820 | 8/1994 | | |
| JP | 2570847 Y2 * | 5/1998 | | |
| JP | 2015031494 A * | 2/2015 | | |
| JP | 2015068559 A * | 4/2015 | | |
| JP | WO 2016017286 A1 * | 2/2016 | ............... | B60H 1/34 |
| JP | 5928932 B2 * | 6/2016 | ........... | B60H 1/3428 |
| WO | WO 2011/032694 A1 | 3/2011 | | |

OTHER PUBLICATIONS

International Search Report dated Nov. 5, 2013 in PCT/JP13/070977 Filed Aug. 2, 2013.
Combined Chinese Office Action and Search Report dated Jan. 27, 2016 in Patent Application No. 201380042075.X (with English translation of categories of cited documents).

* cited by examiner

REGISTER

TECHNICAL FIELD

The present invention relates to a register to be mainly used for adjustment of air blowing of an air conditioner of an automobile, etc., and specifically, to a round register having a cylindrical retainer and a substantially circular air outlet.

BACKGROUND ART

Conventionally, as a round register having a circular air outlet, a register including a round turning louver that is turnable around a central axis along an air blowing direction inside a cylindrical frame is known through the following Patent Document 1, etc.

CITATION LIST

Patent Literature

Patent Document 1: Japanese Examined Utility Model Application Publication No. H03-27237

SUMMARY OF INVENTION

This register has a cylindrical outer frame having a spherical surface inside, and to the inside of the outer frame, an inner frame having an outside spherical surface is fitted turnably and tiltably, and inside the inner frame, a turning louver with four movable blades disposed radially around a central axis is disposed, and each movable blade of the turning louver is axially supported turnably around pivots in the radial directions of the inner frame.

Further, this register is structured so that bevel gears are provided on the terminal end of the central axis and the inner-side ends of the pivots of each movable blade, and the bevel gear provided on the terminal end of the central axis and each bevel gear of the movable blades mesh with each other, and when a knob provided on the tip end of the central axis is rotated, each movable blade turns around their pivots via the bevel gears.

During use of the register, when the knob on the central axis tip end is rotated, four movable blades turn around the pivots in the radial directions via the bevel gears, and in the case where the four movable blades are parallel to the air blowing direction, wind to be blown from the air outlet of the register is converged to the center by the movable blades, however, when the four movable blades tilt around each pivot, the air flow to be blown flows so as to diffuse around the air outlet. Further, when the movable blades are turned until they become parallel to a cross section of the passage, they shut down the passage of the register and stop air blowing.

Technical Problem

However, with this conventional register, to change the wind direction, when the knob is held and the inner frame is tilted (turned) in an arbitrary direction such as upward, downward, rightward, or leftward, etc., with respect to the outer frame, the movable louver tilts together with the inner frame and the wind direction is adjusted, and at this time, the inner frame that tilts (turns) with respect to the outer frame brings its outside spherical surface into contact in a comparatively large area with the inside spherical surface of the outer frame and rotates.

In a register the components of which are formed by molding synthetic resin, normally, errors within tolerances of the dimensions of each component occur among products, and in the structure of the movable louver of the register which is supported turnably by contact between spherical surfaces, due to the dimensional errors within tolerances of the spherical shapes among the products of the register, variation occurs in the frictional resistance when rotating.

Therefore, when the gap between the outer frame and the inner frame is comparatively large and the frictional resistance between these is small, the tilting operation of the inner frame becomes excessively light, and the orientation of the inner frame is easily changed even by a pressure of wind when blowing air, and on the other hand, when the gap between the outer frame and the inner frame is small and the frictional resistance between these is great, the tilting operation of the inner frame becomes heavy and becomes difficult to operate.

Therefore, there was a problem that between the inside spherical surface of the outer frame and the outside spherical surface of the inner frame, a sliding sheet such as nonwoven cloth is interposed to absorb variation of the frictional resistance caused by dimensional errors within tolerances so that a stable operation load is applied to a turning operation, however, in the case where the sliding sheet such as nonwoven cloth is interposed on a comparatively wide contact surface between the inside spherical surface of the outer frame and the outside spherical surface of the inner frame, when the inner frame is turned, the operation load changes according to the operation angle, or a feeling of scraping occurs, and the operation feeling when adjusting the wind direction easily deteriorates.

In the conventional register described above, although air blowing can be adjusted from convergence to diffusion by turning the four movable blades around pivots in the radial directions, when air is diffused and blown, the diffused wind may become turbulent, and therefore, smooth diffused wind has been demanded.

The present invention was made to solve the above-described problems, and an object thereof is to provide a round register that can blow smooth diffused wind and improve the operation feeling when performing a tilting operation.

Solution to Problem

In order to achieve the above-described object, a register according to the present invention is a register including a turning louver turnably with a cylindrical frame disposed inside a cylindrical retainer, and a plurality of movable fins axially supported on the turning louver radially from a centerline parallel to an air blowing direction turnably by radial pivots inside the cylindrical frame, in which on the centerline parallel to the air blowing direction inside the retainer, a ball joint with a ball is disposed, and on the turning louver, a central axial support portion with a plurality of axial support portions projected radially is disposed at the center of the cylindrical frame, and the central axial support portion is attached tiltably and turnably by fitting a ball hole provided at the center with the ball, five movable fins are axially supported at substantially even intervals inside the cylindrical frame so as to be turnable by pivots in radial directions, the inner-side portions of each movable fin are axially supported by each axial support portion of the central axial support portion, five axial support portions are provided at even intervals to project radially from the central axial support portion of the turning louver, the inner-side portions of the five movable fins are axially supported by these axial support portions, and the five movable fins are disposed at even intervals inside the cylindrical frame of the turning louver and constituted so as to close the inside of the cylindrical frame when the movable fins turn until they become substantially parallel to a cross section of the cylindrical frame, to the front surface side center of the central axial support portion, an operation portion is fitted turnably around the centerline of the turning louver, and the operation portion is linked to the inner-side portions of each movable fin via a bevel gear mechanism, and according to a turning operation of the operation portion around the centerline, the movable fins turn around the axial support portions of the central axial support portion via the bevel gear mechanism, and when the operation portion is moved in a radial direction of the cylindrical frame, the turning louver tilts around the ball in a state where the cylindrical frame and the retainer inner surface are not in contact with each other and the turning louver is supported by the ball joint.

According to this invention, when the operation portion at the center of the turning louver is held and the turning louver is tilted in an arbitrary direction, the turning louver tilts around the ball in the state where the cylindrical frame and the retainer inner surface are not in contact with each other and the turning louver is supported by the ball joint, so that as compared with turning support by contact between the inside spherical surface of the outer frame and the outside spherical surface of the inner frame of the conventional register, variation of the operation load caused by dimensional errors among products and the feeling of scraping do not occur, and the turning louver can be tilted with a stable and smooth operation feeling to change the wind direction.

According to the present invention, five axial support portions are provided at even intervals to project radially from the central axial support portion of the turning louver, five movable fins are axially supported by these axial support portions, and the movable fins are disposed at even intervals inside the cylindrical frame of the turning louver and constituted so as to close the inside of the cylindrical frame when the movable fins turn until they become substantially parallel to a cross section of the cylindrical frame, therefore, as compared with the sizes of the four movable blades used in the conventional register, the movable fins can be made smaller in size, and accordingly, without interference of the movable fins with the ball joint, the turning louver can be tilted.

That is, as in the conventional register, when four movable fins are axially supported turnably on the periphery of the central axial support portion, due to the necessity to close the inside of the cylindrical frame when the movable fins turn until they become substantially parallel to a cross section of the cylindrical frame, the movable fins become larger in size than in the case where the louver has five movable fins, and when the turning louver is tilted in the state where the movable fins are parallel to the air blowing direction, the rear portion inner sides of the movable fins interfere with the ball joint and limit the tilting angle of the turning louver.

Here, preferably, a cup-shaped load applying member is interposed between the ball of the ball joint and ball hole of the central axial support portion. Accordingly, due to the load applying member, the turning louver can be tilted with a more stable operation load and a smoother operation feeling.

Further, the above-described bevel gear mechanism can be constituted so that a bevel gear portion of the drive side is joined to the operation portion and axially supported turnably by a center shaft projected from the center of the central axial support portion, bevel gear pieces of the driven side are molded integrally with the vicinities of the inner-side base portions of each movable fin, and the bevel gear portion of the drive side and each bevel gear piece of the driven side mesh with each other. Accordingly, the bevel gear pieces of the driven side are molded integrally with the inner-side portions of each movable fin, so that the number of components can be reduced, and the number of component assembling processes can be reduced.

In addition, a constitution can be adopted in which the cylindrical frame of the turning louver is formed by fitting a front cylindrical frame and a rear cylindrical frame, and along the cross section of the cylindrical frame, a lattice portion is provided, and on the front surface of the lattice portion, the operation portion is supported turnably, and the center portion of the operation portion is joined to the bevel gear mechanism.

In addition, a structure can be adopted in which the pivots are projected outward from each movable fin of the turning louver, and the pivots are sandwiched and supported turnably between the front cylindrical frame and the rear cylindrical frame.

Further, a constitution can be adopted in which inside the retainer, the cylindrical frame of the turning louver is disposed turnably by leaving a slight gap between the outer peripheral surface of the cylindrical frame and the inner peripheral surface of the retainer, and in this state, a bezel is fitted to the front portion of the retainer.

Effects of the Invention

With the register according to the present invention, smooth diffused wind can be blown, and a smooth tilting operation can be performed, so that the operation feeling during a tilting operation is improved and rattling can be prevented from occurring.

EMBODIMENT FOR CARRYING OUT THE INVENTION

Figure 1:
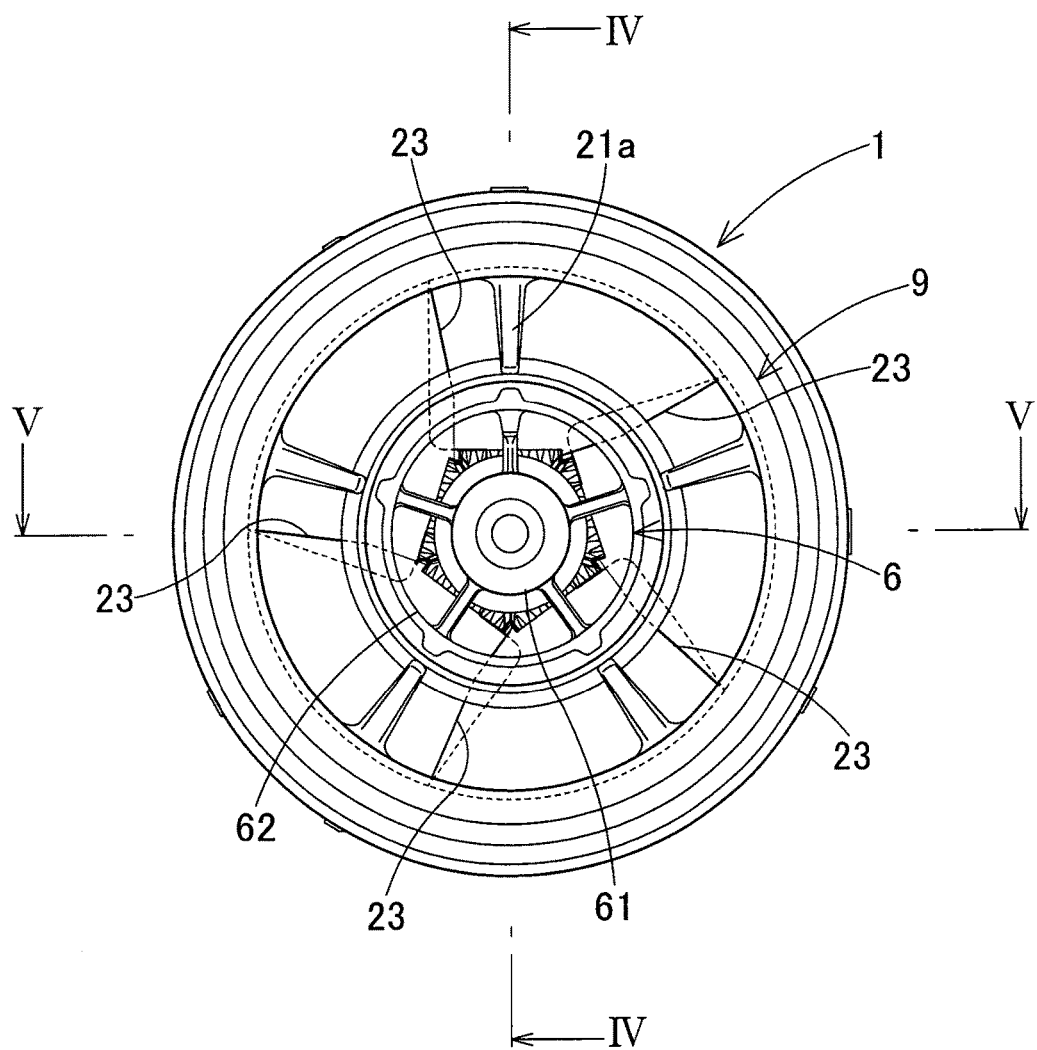
FIG. 1 is a front view of a register showing an embodiment of the present invention.
Figure 2:
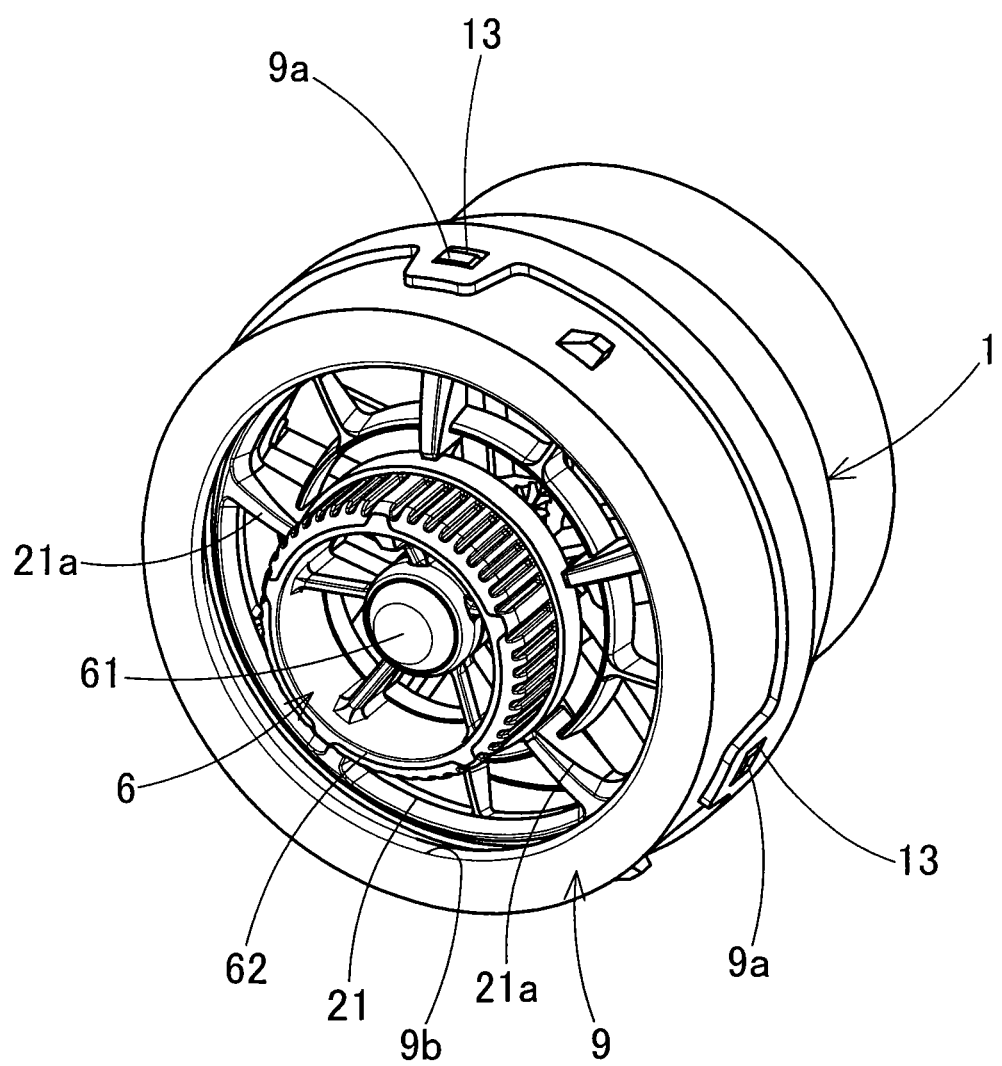
FIG. 2 is a perspective view of the same register.
Figure 4:
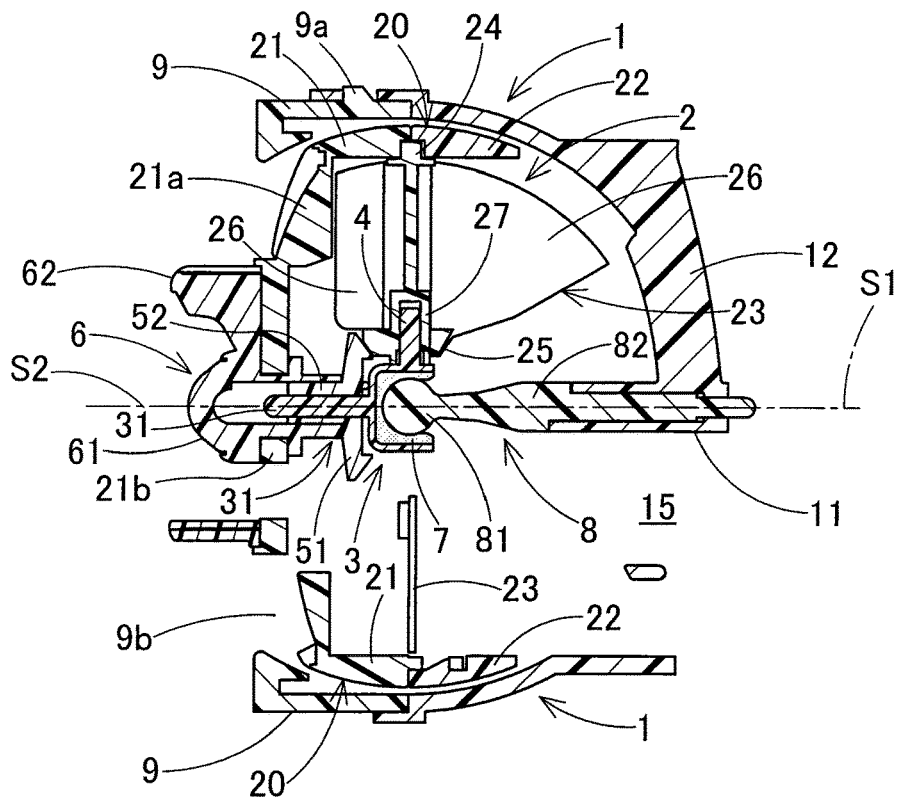
FIG. 4 is a sectional view taken along IV-IV in FIG. 1.

Hereinafter, an embodiment of the present invention is described based on the drawings. FIG. 1 is a front view of a round register for an air conditioner to be installed in the interior of an automobile, and FIG. 2 is a perspective view of the same register. Schematically, in this register, as shown in FIG. 4, a turning louver 2 that has a cylindrical frame 20 is disposed turnably inside a cylindrical retainer 1, and on the turning louver 2, five movable fins 23 are axially supported radially from the centerline S1 parallel to the air blowing direction turnably by radial axial support portions 4 inside the cylindrical frame 20. Inside the retainer 1, a passage 15 is formed, and the retainer 1 opens at the front and rear portions.

Figure 7:
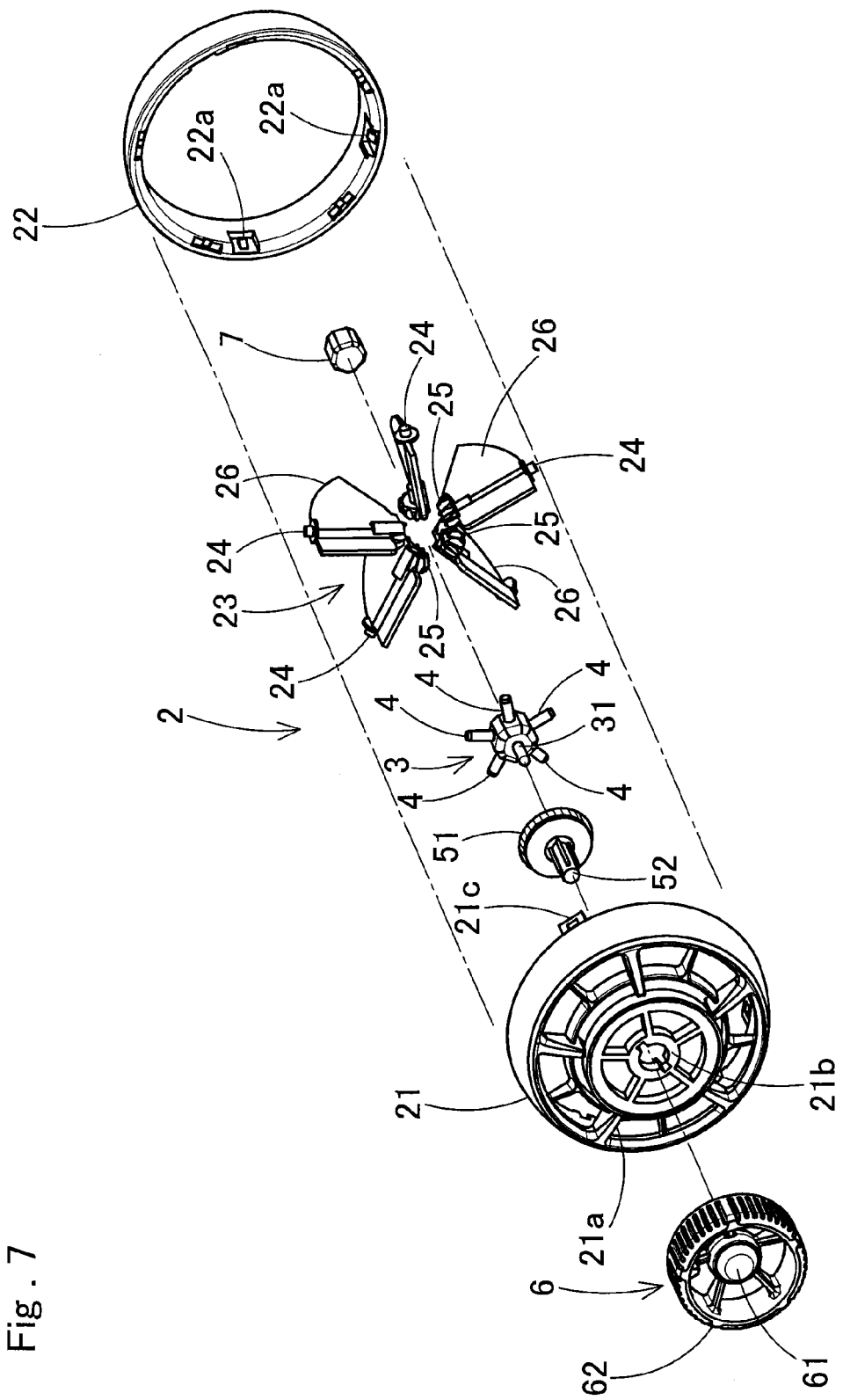
FIG. 7 is an exploded perspective view of a turning louver of the register.
Figure 8:
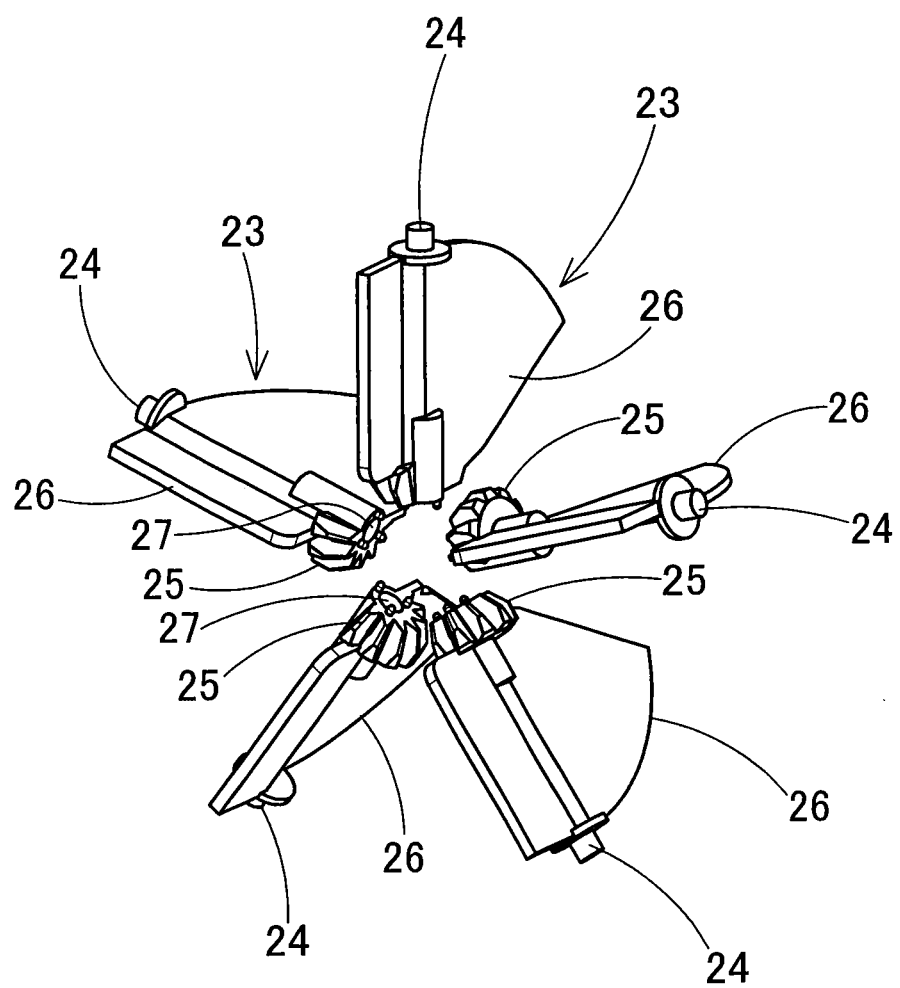
FIG. 8 is an exploded perspective view of movable fins of the turning louver.
Figure 9:
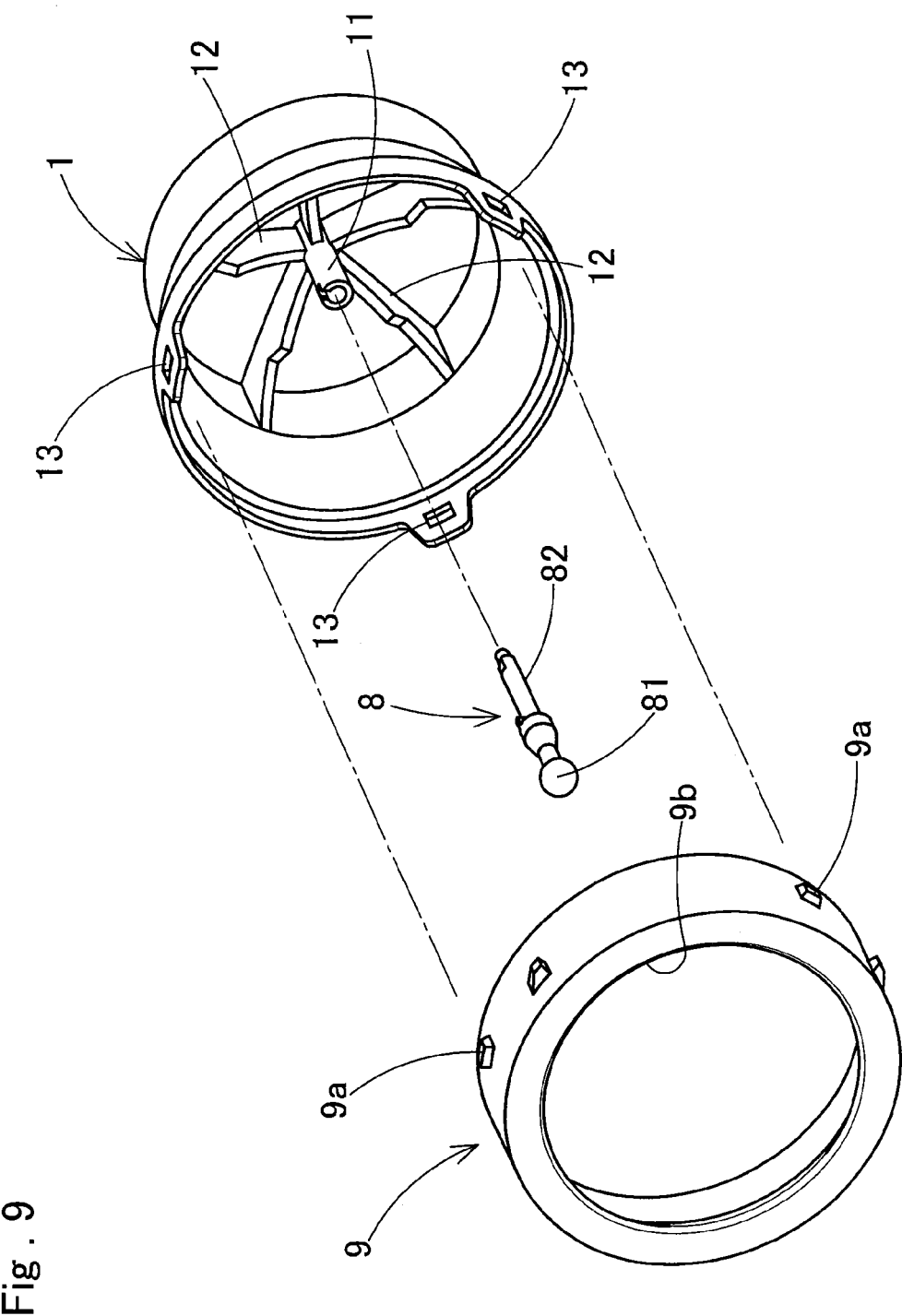
FIG. 9 is an exploded perspective view of a retainer and a bezel.

As shown in FIG. 7 and FIG. 9, on the rear portion inside the retainer 1, a support frame 12 is provided radially, and on the center portion of the support frame 12, a ball joint support portion 11 is provided, and in a shaft hole opened in the axial direction of the ball joint support portion 11, a shaft portion 82 of a ball joint 8 is fitted and attached. The ball joint 8 is structured to support the turning louver 2 including the cylindrical frame 20 and five movable fins 23 on the centerline S1 of the register so as to enable the turning louver to tilt upward, downward, rightward, and leftward, etc., around the centerline S1.

On the front portion outer peripheral portion of the retainer 1, a plurality of latching portions 13 for fitting with the bezel 9 are provided, and on the latching portions 13, latching claws 9a of the bezel 9 are latched. The bezel 9 is formed into a toric shape, and has a circular opening forming an air outlet 9b, and is fitted to the front portion of the retainer 1 in the state where the turning louver 2 is disposed inside.

The turning louver 2 is constituted so that, as shown in FIG. 7, five movable fins 23 are disposed radially inside the cylindrical frame 20, an operation portion 6 that includes a central portion 61 and an outer peripheral portion 62 is axially supported turnably on the center of a front cylindrical frame 21 of the cylindrical frame 20, and according to a turning operation of the operation portion 6, the five movable fins 23 are turned around the radial axial support portions 4, and each movable fin 23 is tilted around the radial pivots 24. The turning louver 2 is constituted so that the five axial support portions 4 are projected radially at even intervals (angular intervals of approximately 72 degrees) from a central axial support portion 3 disposed at the center, and the five movable fins 23 are axially supported by the axial support portions 4 and disposed at even intervals inside the cylindrical frame 20 of the turning louver 2.

Figure 5:
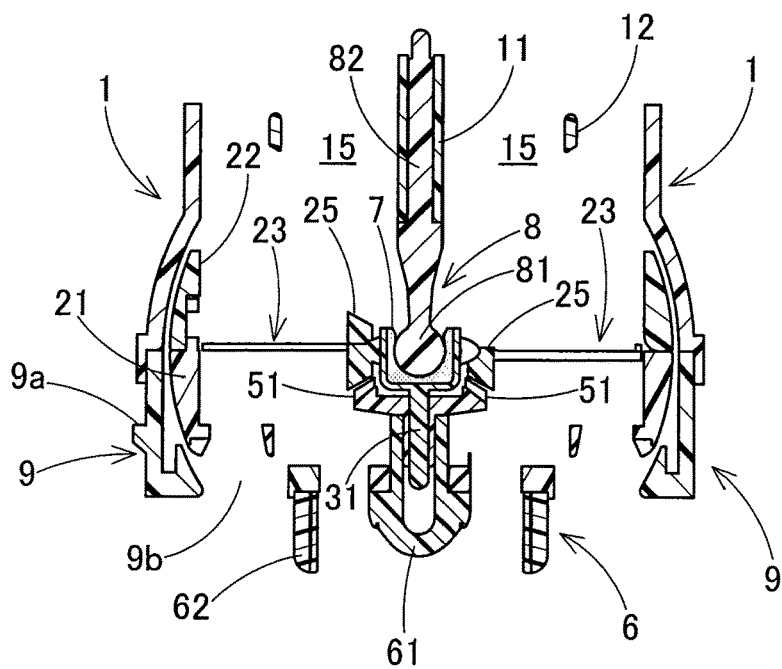
FIG. 5 is a sectional view taken along V-V in FIG. 1.
Figure 6:
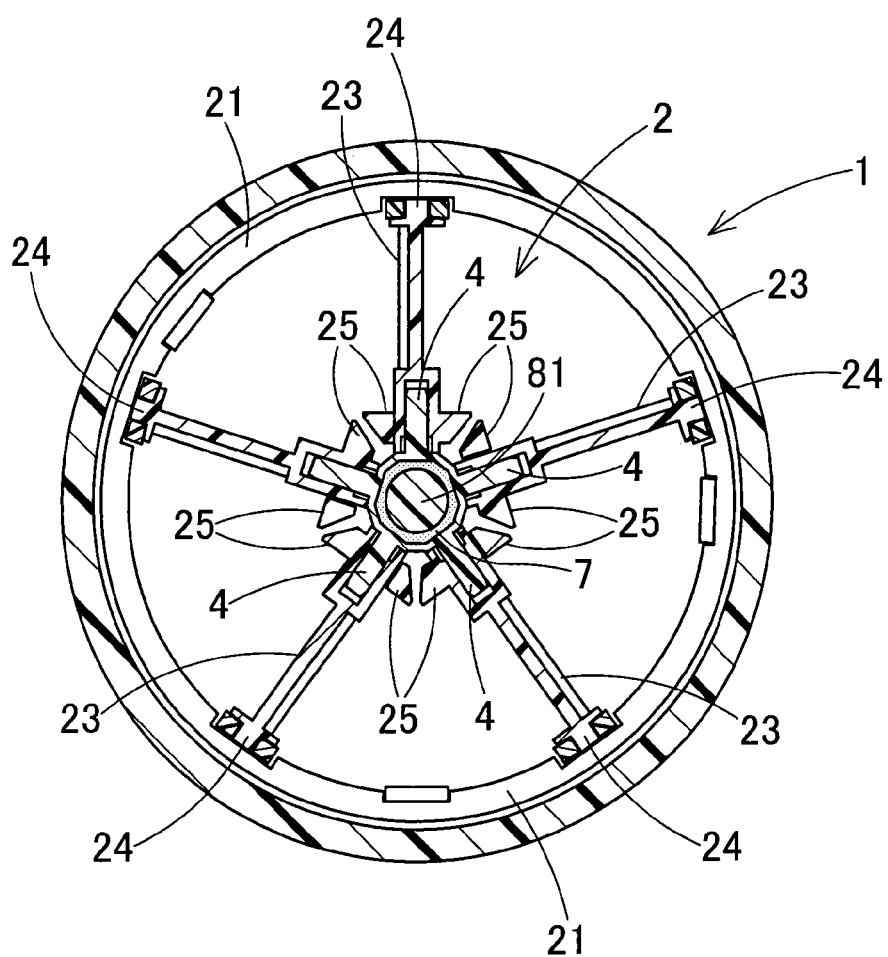
FIG. 6 is a sectional view taken along VI-VI in FIG. 3.

When the movable fins 23 of the turning louver 2 are operated to turn, the movable fins 23 turn until they become parallel to the cross direction of the passage 15 (FIG. 5) inside the retainer at the turning ends in the closing direction, and by the five movable fins 23, the inside of the cylindrical frame 20, that is, the passage 15 is fully closed.

The register having this turning louver 2 is stored turnably inside the retainer 1, and as shown in FIG. 9, to its front portion, the bezel 9 is fitted. In this state, inside the retainer 1, the cylindrical frame 20 of the turning louver 2 is disposed turnably by leaving a slight gap between its outer peripheral surface and the inner peripheral surface of the retainer 1, and in this state, the bezel 9 is fitted to the front portion of the retainer 1.

As described above, the ball joint 8 that supports the turning louver 2 is disposed by inserting its shaft portion 82 into the ball joint support portion 11 on the centerline S1 parallel to the air blowing direction inside the retainer 1, and on the front side tip end of the shaft portion 82, a ball 81 is provided, and with this ball 81, a ball hole 41 (FIG. 11) at the center of the central axial support portion 3 is fitted via the loading applying member 7 so as to make the turning louver tiltable and turnable.

Figure 10A:
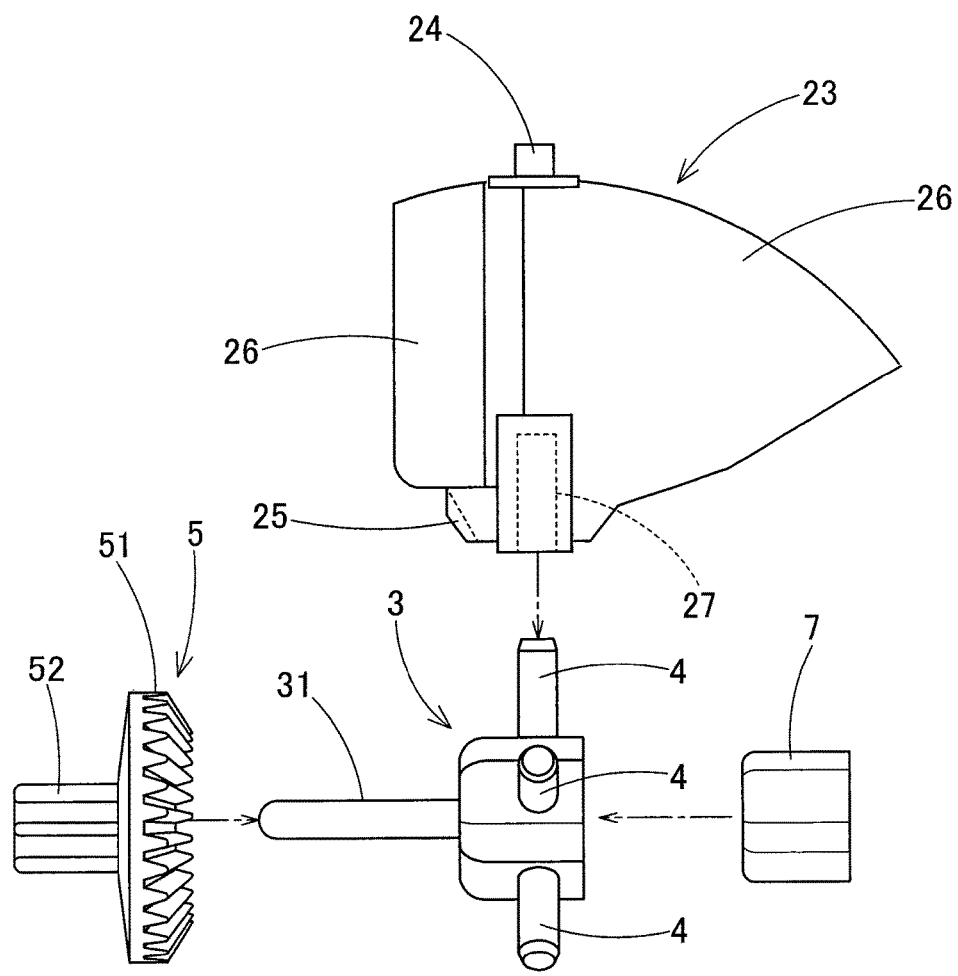
FIG. 10(a) is an exploded side view of movable fins, a central axial support portion, a bevel gear mechanism, and a load applying member.
Figure 10B:
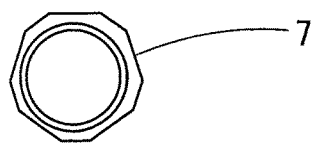
FIG. 10(b) is a front view of the load applying member.
Figure 11:
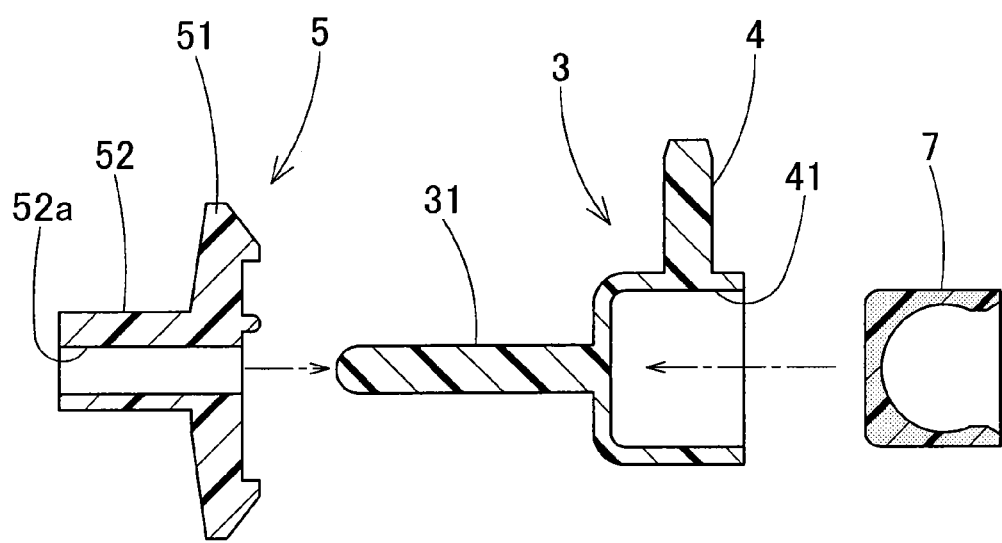
FIG. 11 is an exploded sectional view of the central axial support portion, the bevel gear mechanism, and the load applying member.
Figure 12:
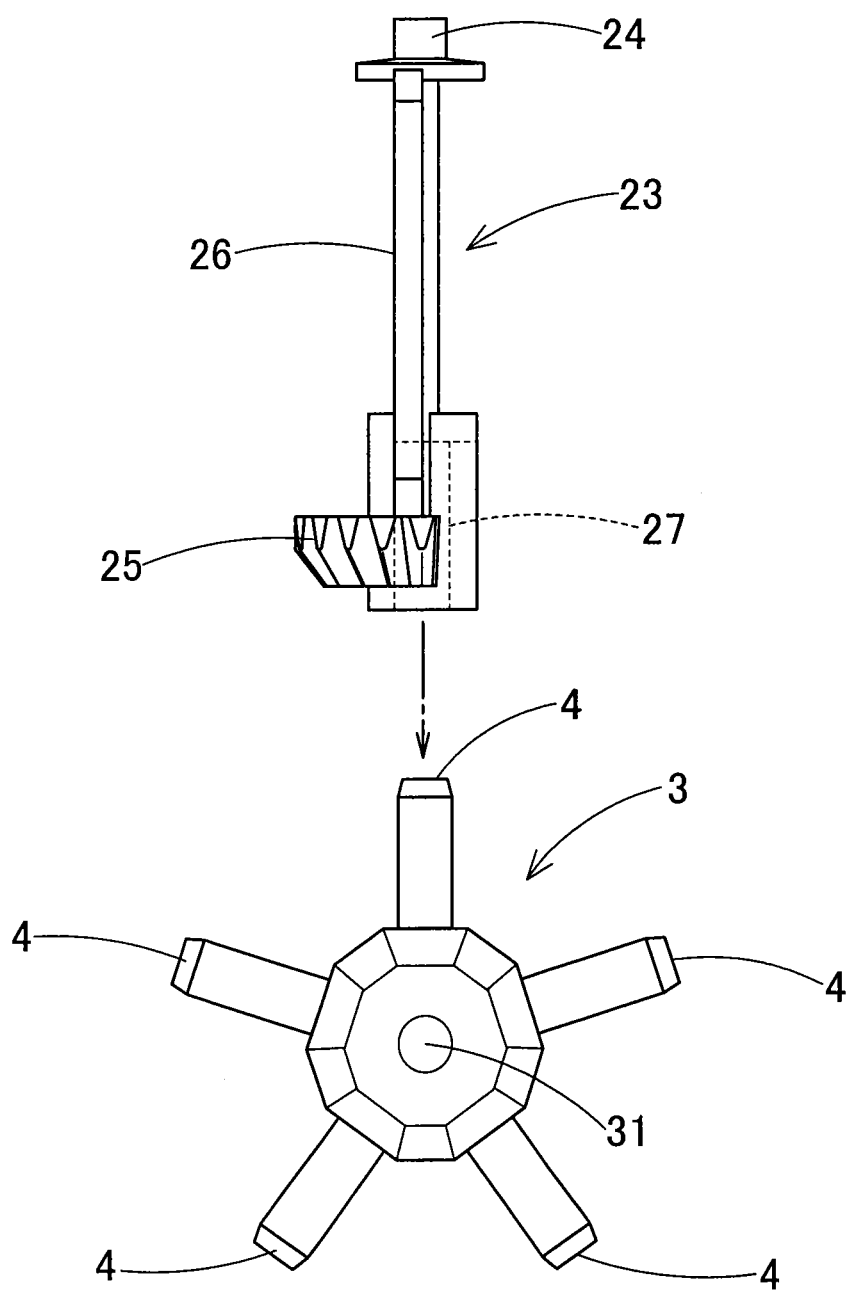
FIG. 12 is an exploded front view of the central axial support portion 3 and the movable fins.
Figure 13A:
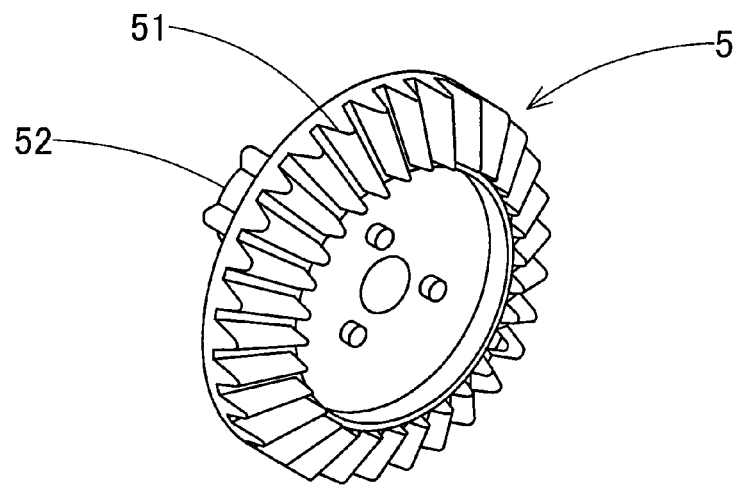
FIG. 13(a) is a perspective view of a bevel gear portion of the bevel gear mechanism 5.
Figure 13B:
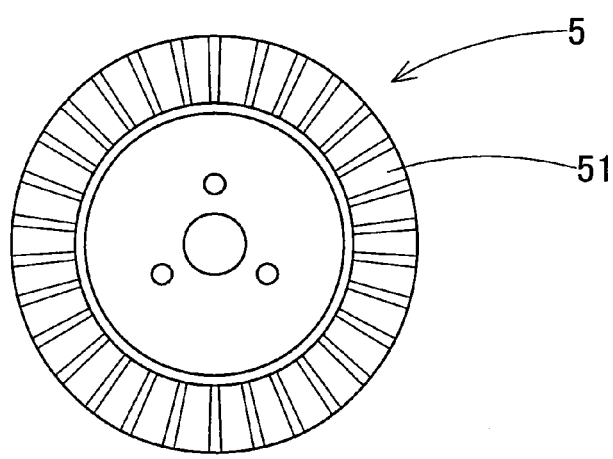
FIG. 13(b) is a front view of the same bevel gear portion.

The load applying member 7 is formed into a cup shape from a rubbery elastic body such as thermoplastic elastomer, and fitted in the ball hole 41 at the center of the central axial support portion 3, and inside the load applying member 7, the ball 81 of the ball joint 8 is fitted as shown in FIG. 10 and FIG. 11. Accordingly, the turning louver 2 is fitted inside the passage 15 of the retainer 1 so as to be tiltable and turnable around the ball 81 of the ball joint 8 via the load applying member 7.

The turning louver 2 is constituted so that, as shown in FIG. 4 and FIG. 7, etc., the central axial support portion 3 from on which five axial support portions 4 are projected radially is disposed at the center of the cylindrical frame 20, and from the central axial support portion 3, the five axial support portions 4 are projected radially at even intervals (angular intervals of approximately 72 degrees), and further, in the central axial direction, a center shaft 31 is projected.

Figure 16:
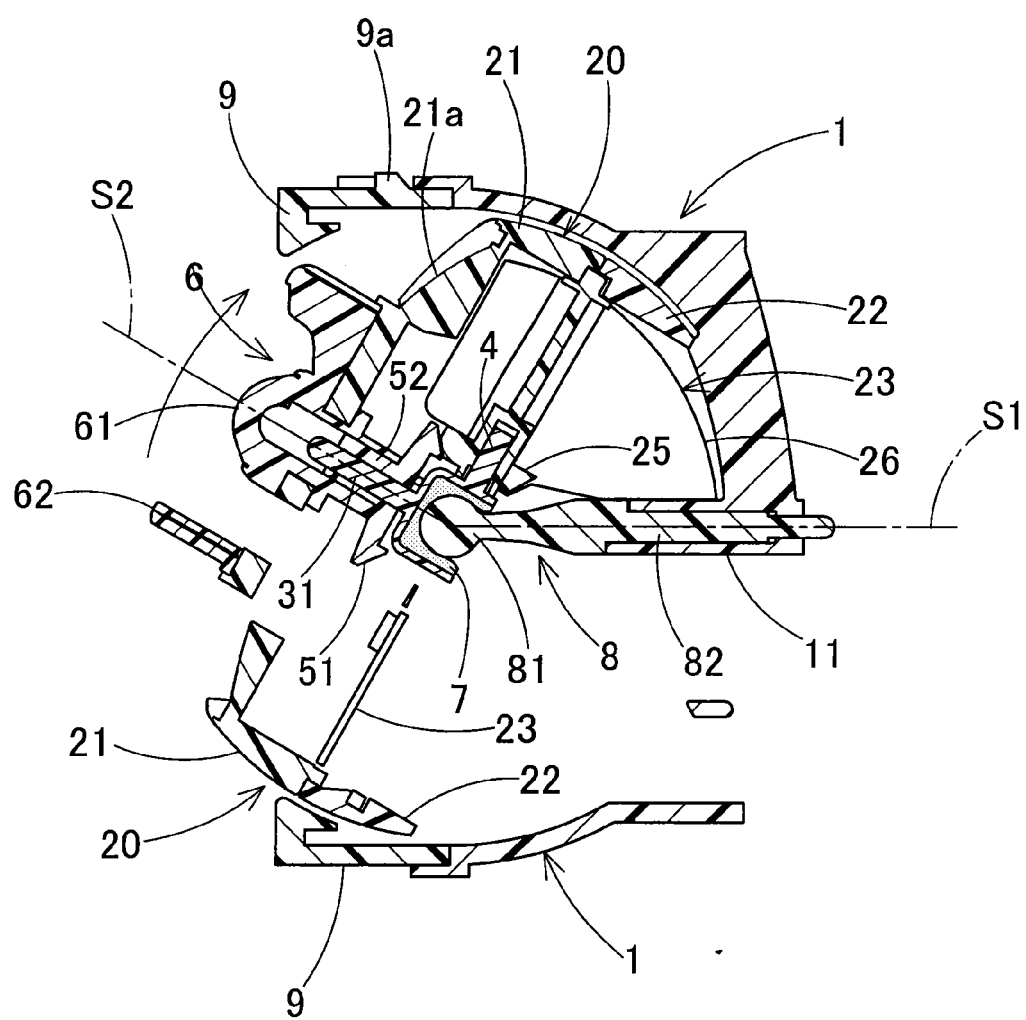
FIG. 16 is a longitudinal sectional view in the state where the turning louver is tilted up.

Thus, the ball 81 of the ball joint 8 is fitted in the ball hole of the load applying member 7 with an appropriate frictional resistance, and the ball hole 41 at the center of the central axial support portion 3 is fitted with the ball 81 of the ball joint 8 via the load applying member 7, so that, as shown in FIG. 16, the turning louver 2 is tiltable in an arbitrary direction such as upward, downward, rightward, and leftward, etc., with an appropriate operation load and the center of the ball 81 as a turning center point, and turnable around the centerline S2. As shown in FIG. 16, etc., the outer peripheral portion of the cylindrical frame 20 of the turning louver 2 turns without contact with the inner surface of the retainer 1, so that during a turning/tilting operation, without an unstable operation load or the feeling of scraping that occurs with the conventional register, the turning louver can be smoothly turned or tilted by being supported by the ball joint 8.

As described above, the turning louver 2 is structured to include five movable fins 23, and by fitting and supporting bearing holes 27 on the inner-side end portion with the radial axial support portions 4 of the central axial support portion 3, the five movable fins 23 are radially disposed at substantially even intervals (angular intervals of approximately 72 degrees) inside the cylindrical frame 20. Further, the pivots 24 projected radially outward from each movable fin 23 are sandwiched between the front cylindrical frame 21 and each rear cylindrical frame 22 of the cylindrical frame 20, and accordingly, the movable fins 23 are axially supported turnably around the axial support portions 4 extending radially in the outer peripheral direction of the central axial support portion 3 and the pivots 24.

This turning louver 2 is structured so that, when each movable fin 23 is turned around the pivots 24 and the axial support portions 4, at their turning ends, the fin main bodies 26 of the movable fins 23 become substantially parallel to a cross section of the cylindrical frame 20 to fully close the passage 15 and shut off air blowing. Therefore, the fin main bodies 26 of the five movable fins 23 have shapes and sizes that enable these fins to fully close when they are juxtaposed in a cross section perpendicular to the air flowing direction in the passage 15.

Figure 19:
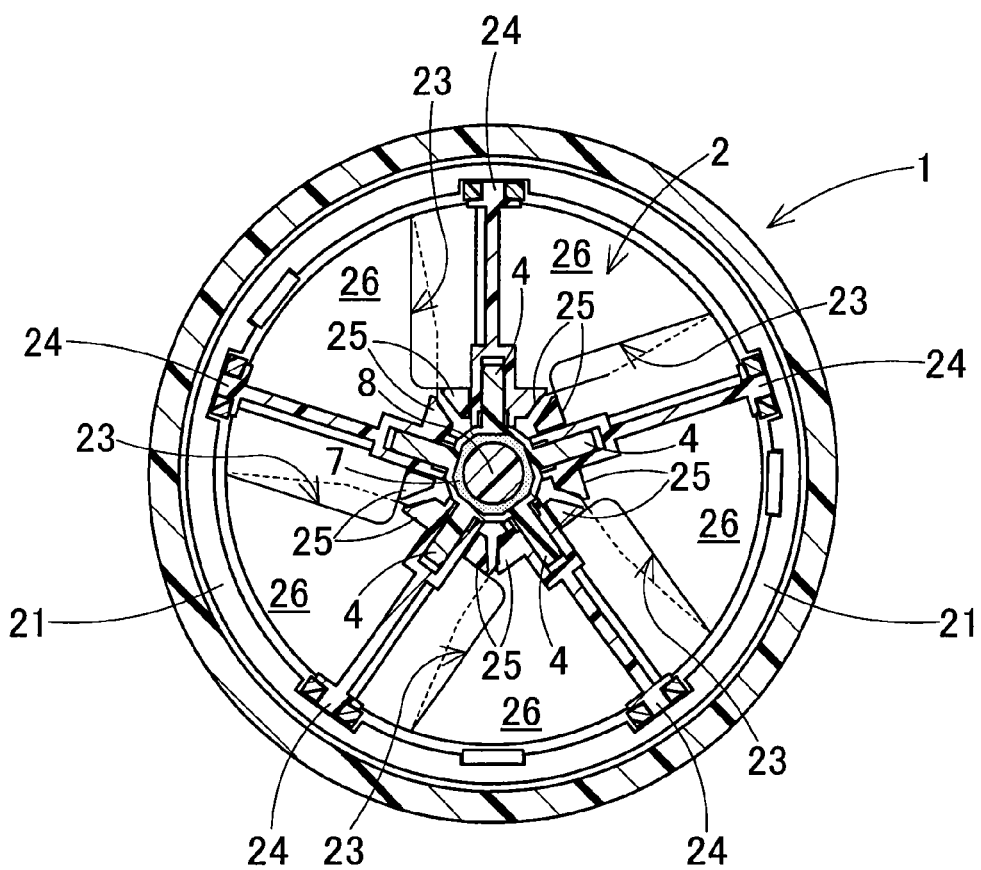
FIG. 19 is a longitudinal sectional view when the movable fins of the turning louver are shut down, corresponding to FIG. 6.

That is, as shown in FIG. 19, the movable fins 23 are formed into shapes and sizes that enable these fins to fully close the passage 15 when the turning louver 2 turns the five movable fins 23 until they become parallel to a cross section perpendicular to the air flowing direction. Thus, the turning louver 2 includes juxtaposed five movable fins 23, so that the sizes of the fin main bodies 26 of the movable fins 23 can be made smaller than in the case where the louver has four movable fins. Accordingly, when the turning louver 2 tilts upward, downward, rightward, or leftward, etc., movable fins 23 can tilt to a predetermined maximum angle without being interfered by the ball joint 8.

In addition, in the case where the number of movable fins 23 of the turning louver 2 is five, when the movable fins 23 are turned around the pivots 24 to diffuse wind, the wind when being blown is diffused with higher efficiency than in the conventional case where the turning louver has four movable fins, so that efficiently diffused mild wind can be blown to the periphery of the air outlet.

Further, as described above, according to downsizing of the movable fins 23, the lengths in the axial direction in the state where the movable fins 23 become parallel to the axial direction (air blowing direction) of the passage 15 can be made shorter. Therefore, the length of the retainer 1 can be made shorter than in the conventional register with four movable fins, and accordingly, the register installation space can be saved.

Figure 3:
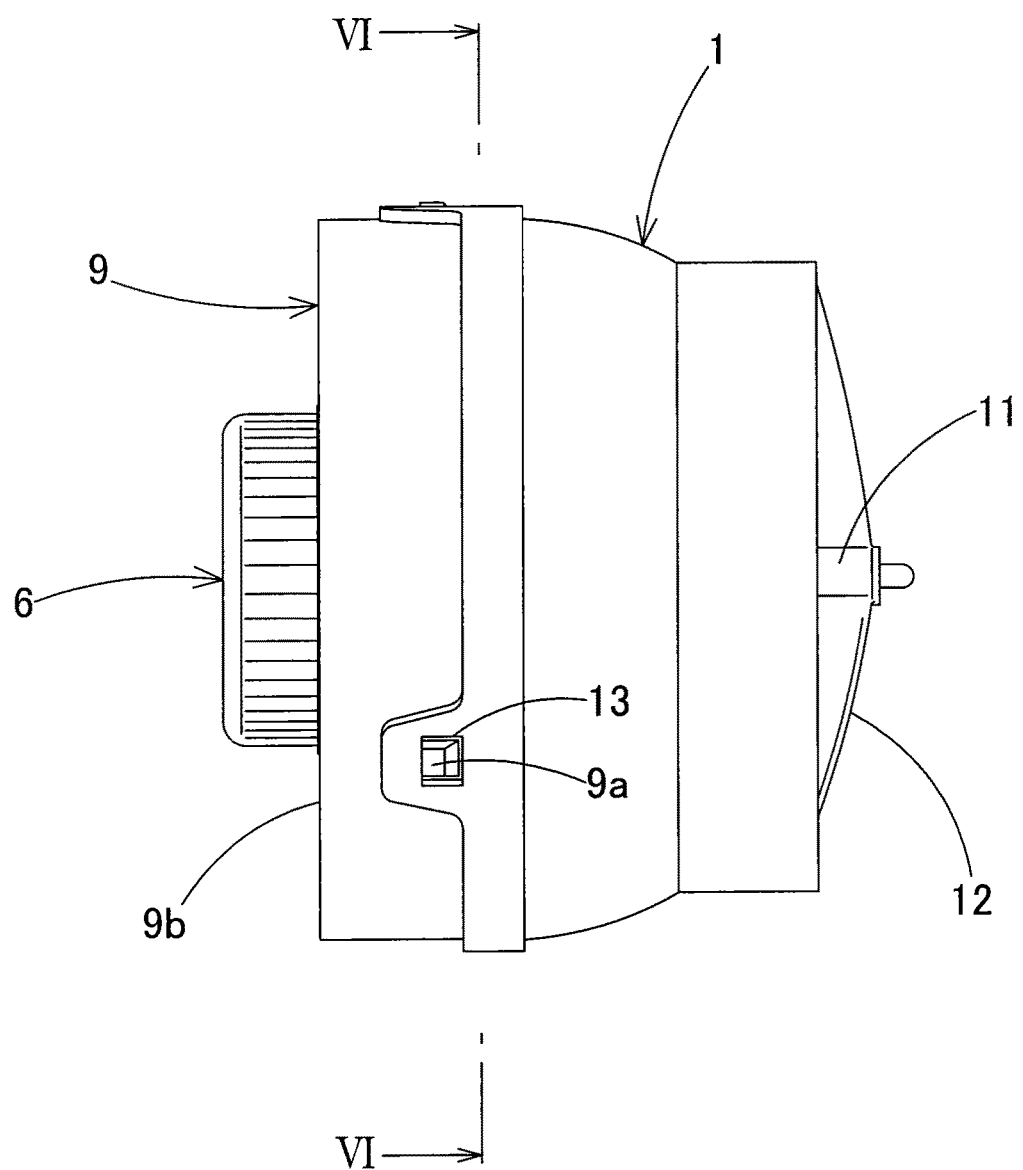
FIG. 3 is a right side view of the same register.

The operation portion 6 of the register is formed into a toric dial shape as shown in FIG. 7, etc., and is fitted turnably to the center of the lattice portion 21a on the front portion of the cylindrical frame 20 of the turning louver 2. At the center of the lattice portion 21a, a bearing hole 21b is provided, and through this bearing hole 21b, the shaft portion 52 of the bevel gear portion 51 of the bevel gear mechanism 5 is inserted, and the operation portion 6 is fitted and attached to the shaft portion 52. Accordingly, when the operation portion 6 is turned, the bevel gear portion 51 of the bevel gear mechanism 5 turns. As shown in FIG. 3 and FIG. 4, the operation portion 6 is provided so as to project slightly forward of the air outlet 9b of the bezel 9. Accordingly, at the time of use, a user can easily hold the operation portion 6 to perform a tilting operation or turning operation.

The bevel gear portion 51 of the bevel gear mechanism 5 turns around the center shaft 31 of the central axial support portion 3, and bevel gear pieces 25 provided on the inner-side end portions of each movable fin 23 axially supported by each axial support portion 4 extending radially from the central axial support portion 3 mesh with the bevel gear portion 51. Therefore, when the operation portion 6 is turned, the bevel gear pieces 25 are driven and turns via the bevel gear portion 51, and each movable fin 23 of the turning louver 2 turns around the pivots 24 and the axial support portions 4. That is, the bevel gear mechanism 5 is constituted by meshing the bevel gear portion 51 of the drive side with the bevel gear pieces 25 of the driven side as shown in FIG. 10, and the shaft portion 52 is projected from the center of the bevel gear portion 51 of the drive side, and the shaft portion 52 is joined to the center of the operation portion 6. The shaft portion 52 is inserted through the bearing hole 21b provided at the center of the lattice portion 21a of the front cylindrical frame 21 and supported turnably.

Figure 14:
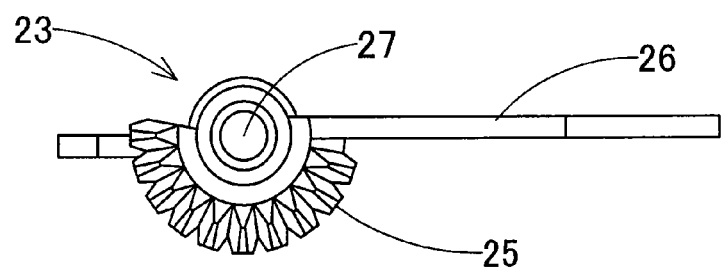
FIG. 14 is a plan view of the movable fin.

The bevel gear portion 51 of the bevel gear mechanism 5 has a shaft hole 52a formed in the axial direction of the shaft portion 52, and through this shaft hole 52a, the center shaft 31 of the central axial support portion 3 is inserted turnably as shown in FIG. 11. Accordingly, the bevel gear portion 51 of the drive side is supported turnably by the center shaft projected from the center of the central axial support portion 3. The bevel gear pieces 25 of the driven side which mesh with the bevel gear portion 51 of the drive side are molded integrally with the inner-side portions of each movable fin 23 as shown in FIG. 10. That is, in the bearing holes 27 provided on the inner-side end portions of the movable fins 23, the axial support portions 4 of the central axial support portion 3 are inserted, and the bevel gear pieces 25 of the driven side can be molded integrally around the bearing holes 27 provided in the inner-side portions of the movable fins 23. The turning range of each movable fin 23 is approximately 90 degrees, so that the bevel gear pieces 25 do not need to be formed into toric wheel shapes, and as shown in FIG. 14, are formed so as to have an angle range of approximately 180 degrees, that is, formed as substantially semicircular tooth portions.

Figure 15:
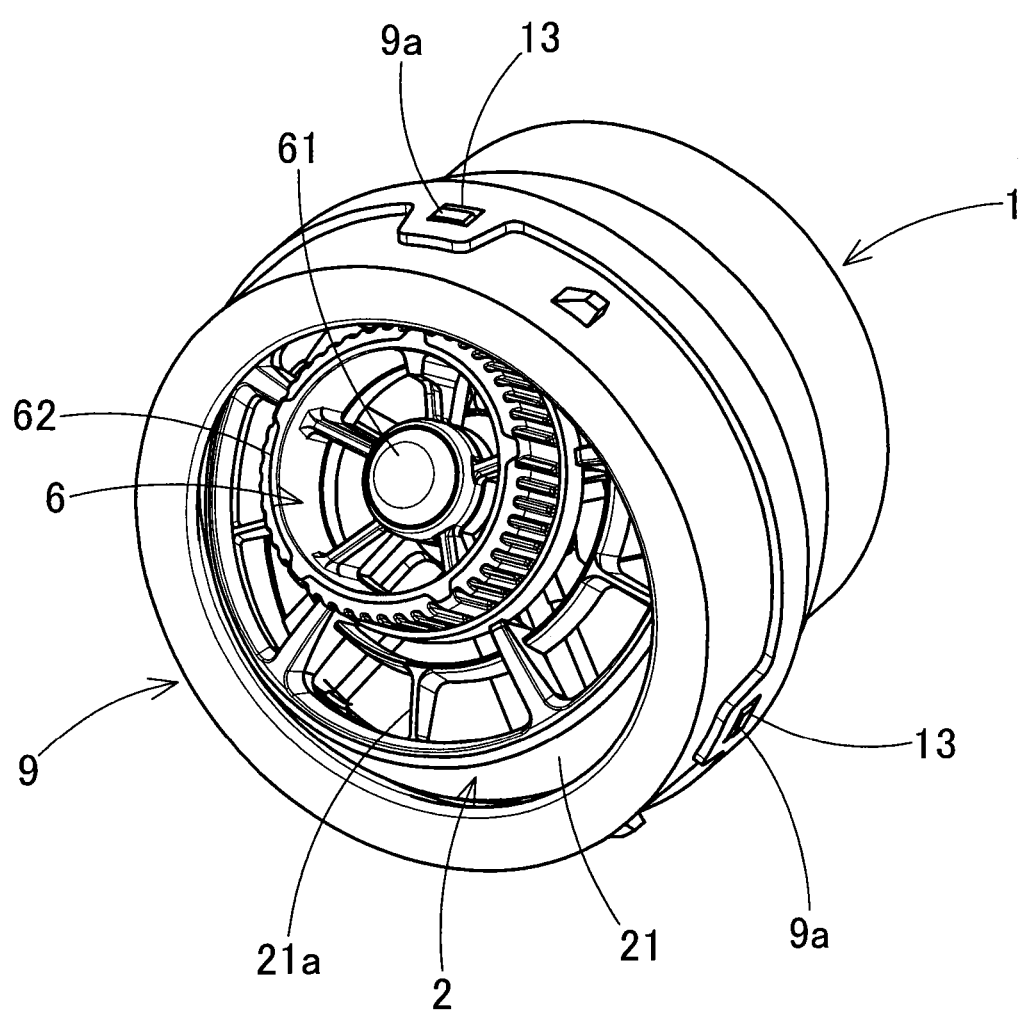
FIG. 15 is a perspective view in a state where the turning louver is tilted up.
Figure 17:
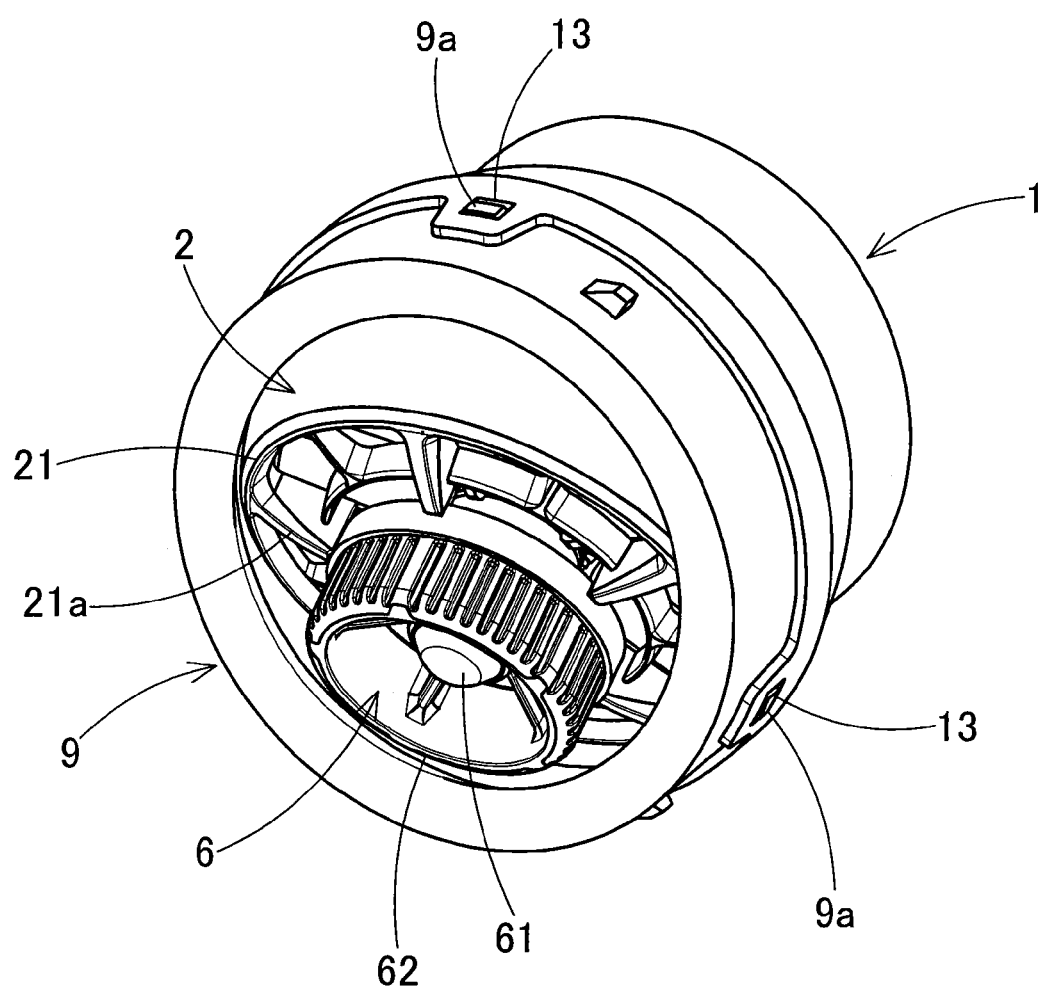
FIG. 17 is a perspective view in a state where the turning louver is tilted down.

With the above-described constitution, when the bevel gear portion 51 of the drive side turns according to the operation portion 6, the bevel gear pieces 25 of the driven side rotate in the ranges of approximately 90 degrees around the axial support portions 4, and accordingly, as shown in FIG. 16, the movable fins 23 turn from the states parallel to the centerline S2 of the turning louver 2 until they become parallel to a vertical plane perpendicular to the centerline S2 (shut down the passage). As described above, when the operation portion 6 is held and the turning louver 2 is tilted or turned in an arbitrary direction such as upward, downward, rightward, or leftward as shown in FIG. 15 and FIG. 17, the turning louver 2 tilts or turns in the arbitrary direction while being supported by only the ball joint 8.

The register constituted as described above is fitted to, for example, an air outlet, etc., of an air conditioner provided on an instrument panel of an automobile, and used. To change the air blowing direction of the register, the operation portion 6 is held and the turning louver 2 is tilted or turned. The operation portion 6 is formed into a dial shape and disposed to project slightly forward of the air outlet 9b of the bezel 9, so that a user can easily hold the operation portion 6 to perform a tilting operation or turning operation.

As shown in FIG. 2 and FIG. 4, when the turning louver 2 is oriented straight forward of the register, that is, in the state where the movable fins 23 of the turning louver 2 are parallel to the centerline S2 along the axial direction of the passage 15, the air flow is guided by the movable fins 23 of the turning louver 2 and blown straight forward, and at this time, air is blown to concentrate in a comparatively narrow forward range.

On the other hand, to diffusely blow air to a comparatively wide range in the periphery in front of the air outlet 9b, the operation portion 6 is held and turned right or left so as to twist around the centerline S2.

At this time, the turning force of the operation portion 6 is transmitted to the bevel gear portion 55 via the shaft portion 52 of the bevel gear mechanism 5 and the bevel gear portion 51 rotates, and this rotation is transmitted to the bevel gear pieces 25 of the five movable fins 23 which mesh with the bevel gear 51, and the five movable fins 23 turn around the pivots 24 and the axial support portions 4, and the fin main bodies 26 of each movable fin 23 turn around the axes in the radial directions along the cross section of the passage 15 so as to tilt forward or rearward.

Accordingly, when the air flow passes through the turning louver 2, it spreads to the surroundings so as to whirl around the centerline S2 of the turning louver 2, and is blown to diffuse to the surroundings of the air outlet 9b. At this time, by the five movable fins 23 disposed inside the air outlet, the blown wind is guided and diffused to the surroundings, so that milder wind can be blown than in the conventional register having four movable fins.

On the other hand, to shut off air blowing, the operation portion 6 is further turned right or left to the turning end. Accordingly, each movable fin 23 of the turning louver 2 turns around the pivots 24 and the axial support portions 4 until they become parallel to a vertical plane perpendicular to the centerlines S1 and S2 (shut down the passage) as shown in FIG. 19, and accordingly, the passage 15 is fully closed and air blowing is shut off.

Figure 18:
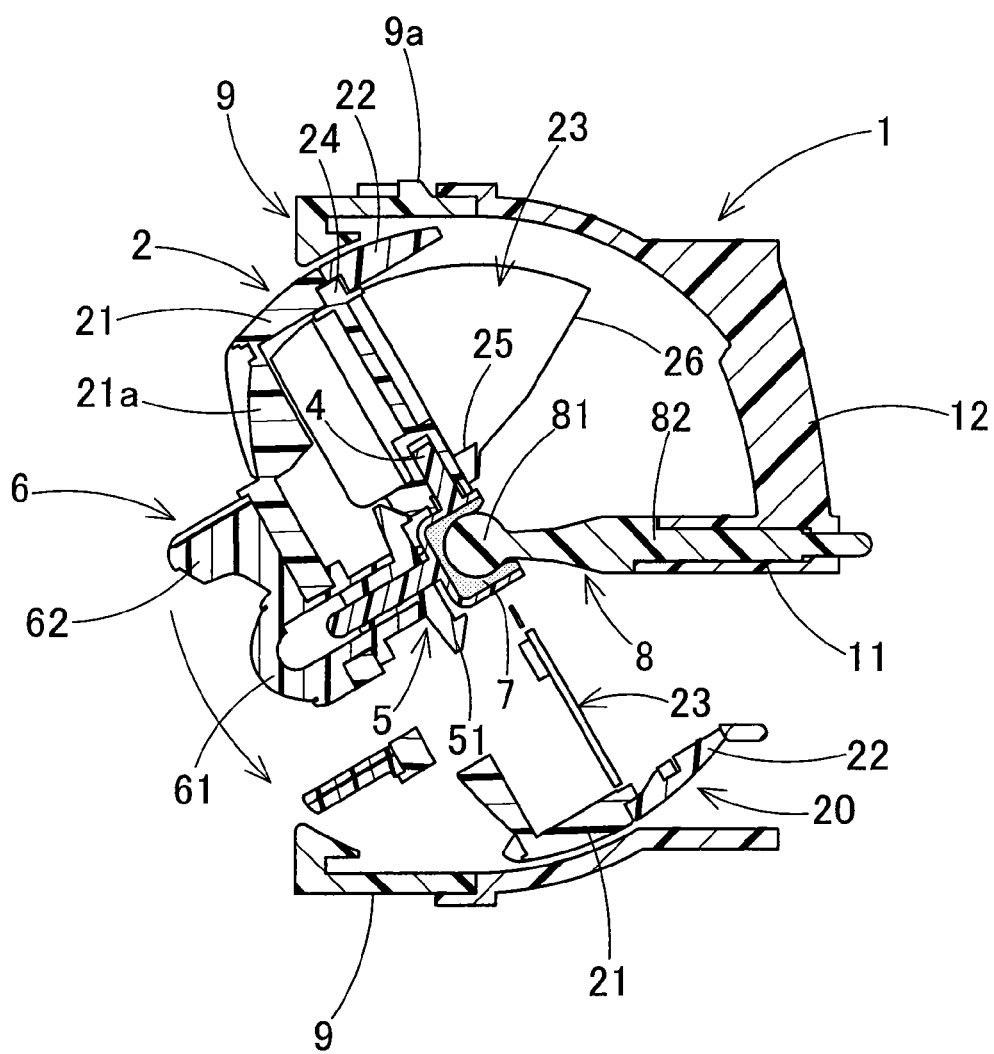
FIG. 18 is a longitudinal sectional view in the state where the turning louver is tilted down.

On the other hand, to orient the wind direction obliquely upward, when the operation portion 6 is held and operated upward, as shown in FIG. 15 and FIG. 16, the turning louver 2 including the operation portion 6 turns (tilts) up around the ball 81 of the ball joint 8, and the centerline S2 of the turning louver 2 inclines upward with respect to the centerline S1 of the retainer 1 as shown in FIG. 16, and accordingly, the wind is oriented obliquely upward. Similarly, to orient the wind direction obliquely downward, when the operation portion 6 is held and operated downward, as shown in FIG. 17 and FIG. 18, the turning louver 2 including the operation portion 6 turns (tilts) down around the ball 81 of the ball joint 8, and the centerline S2 of the turning louver 2 inclines downward with respect to the centerline S1 of the retainer 1 as shown in FIG. 18, and accordingly, the wind is oriented obliquely downward. Thus, by tilting the operation portion 6 in an arbitrary direction such as upward/downward or rightward/leftward, etc., the wind can be oriented toward an arbitrary direction.

At this time, the turning louver 2 tilts around the ball 81 in the state where the cylindrical frame 20 and the inner surface of the retainer 1 are not in contact with each other and the turning louver is supported by only the ball joint 8, so that in comparison with turning support by the contact between the inside spherical surface of the outer frame and the outside spherical surface of the inner frame as in the conventional register, variation of the operation load caused by dimensional errors among the products and the feeling of scraping do not occur, and the turning louver 2 can be tilted with a stable smooth operation feeling to change the wind direction.

The cup-shaped load applying member 7 is interposed between the ball 81 of the ball joint 8 and the ball hole 41 of the central axial support portion 3, so that the turning louver 2 can be tilted with a more stable operation load and smooth operation feeling by being given an appropriate operation load (frictional resistance) by this load applying member 7.

On the other hand, in the state where the turning louver 2 is tilted as described above, when the operation portion 6 is further turned around the centerline S2, in the same manner as described above, the turning force of the operation portion 6 is transmitted to the bevel gear portion 51 via the shaft portion 52 of the bevel gear mechanism 5, the bevel gear portion 51 rotates, and this rotation is transmitted to the bevel gear pieces 25 of the five movable fins 23 which mesh with the bevel gear portion 51, and the five movable fins 23 turn around the pivots 24 and the axial support portions 4. Accordingly, the air flow passing through the turning louver 2 changes from a state where the air flow is blown to concentrate along the centerline S2 to a state where the air flow is diffused to the surroundings so as to whirl around the centerline S2 of the turning louver 2, and in the same manner as described above, the air blowing state can be adjusted so as to change from the concentrated state into a diffused state.

Thus, when the operation portion 6 at the center of the turning louver 2 is held and the turning louver 2 is tilted in an arbitrary direction, the turning louver 2 tilts around the ball 81 while being supported by the ball joint 8 in a state where the cylindrical frame 20 and the inner surface of the retainer 1 are not in contact with each other, so that as compared with turning support by the contact between the inside spherical surface of the outer frame and the outside spherical surface of the inner frame as in the conventional register of this kind, variation of the operation load caused by dimensional errors among the products and the feeling of scraping do not occur, and the wind direction can be changed by tilting the turning louver 2 with a stable and smooth operation feeling.

The turning louver 2 according to the embodiment described above is provided with five movable fins 23, however, for example, the number of movable fins may be three or six. Also, the operation portion 6 has a toric shape, however, it may be formed into another shape such as a polygonal shape.

REFERENCE SIGNS LIST

1 Retainer
2 Turning louver
3 Central axial support portion
4 Axial support portion
5 Bevel gear mechanism
6 Operation portion
7 Load applying member
8 Ball joint
9 Bezel
9a Latching claw
9b Air outlet
11 Ball joint support portion
12 Support frame
13 Latching portion
15 Passage
20 Cylindrical frame
21 Front cylindrical frame
21a Lattice portion
21b Bearing hole
22 Rear cylindrical frame
23 Movable fin
24 Pivot
25 Bevel gear piece
26 Fin main body
27 Bearing hole
31 Center shaft
41 Ball hole
51 Bevel gear portion
52 Shaft portion
52a Shaft hole 81 Ball
82 Shaft portion

The invention claimed is:

1. A register comprising:

a turning louver turnable with a cylindrical frame disposed inside a cylindrical retainer, and a plurality of movable fins including five movable fins axially supported on the turning louver radially from a centerline parallel to an air blowing direction turnably by radial pivots inside the cylindrical frame, wherein on the centerline parallel to the air blowing direction inside the retainer, a ball joint with a ball is disposed, the ball is provided on a tip end of a shaft portion attached at a center of a support frame provided on a rear portion in the retainer, and the shaft portion and a ball joint support portion extend axially from the support frame on the turning louver, a central axial support portion with a plurality of axial support portions including five axial support portions projected radially is disposed at a center of the cylindrical frame, and the central axial support portion is attached tiltably and turnably by fitting a ball hole provided at the center with the ball, the five movable fins are axially supported at substantially even intervals inside the cylindrical frame so as to be turnable by the pivots in radial directions, and inner-side portions of the five movable fins are axially supported by the five axial support portions of the central axial support portion, the five axial support portions are provided at even intervals to project radially from the central axial support portion of the turning louver, and the five movable fins are disposed at even intervals inside the cylindrical frame of the turning louver and configured so as to close an inside of the cylindrical frame when the five movable fins turn until they become substantially parallel to a cross section of the cylindrical frame, an operation portion that is disposed in front of the central axial support portion is fitted turnably around the centerline of the turning louver, and the operation portion is linked to each of the five movable fins via a bevel gear mechanism, and according to a turning operation of the operation portion around the centerline, the five movable fins turn around the five axial support portions of the central axial support portion via the bevel gear mechanism, and when the operation portion is moved in a radial direction of the cylindrical frame, the turning louver tilts around the ball in a state where the cylindrical frame and a retainer inner surface are not in contact with each other and the turning louver is supported by the ball joint.

2. The register according to claim 1, wherein a cup-shaped load applying member is interposed between the ball of the ball joint and the ball hole of the central axial support portion.

3. The register according to claim 1, wherein the bevel gear mechanism is configured so that a bevel gear portion of a drive side is joined to the operation portion and axially supported turnably by a center shaft projected from the center of the central axial support portion, and bevel gear pieces of a driven side are molded integrally with the five movable fins at a radially inner side of the five movable fins, and the bevel gear portion of the drive side and each of the bevel gear pieces of the driven side mesh with each other.

4. The register according to claim 1, wherein the cylindrical frame of the turning louver is formed by fitting a front cylindrical frame and a rear cylindrical frame, and along the cross section of the cylindrical frame, a lattice portion is provided, and on a front surface of the lattice portion, the operation portion is supported turnably, and a center portion of the operation portion is joined to the bevel gear mechanism.

5. The register according to claim 4, wherein the pivots are projected outward from the five movable fins of the turning louver, and the pivots are sandwiched and supported turnably between the front cylindrical frame and the rear cylindrical frame.

6. The register according to claim 1, wherein inside the retainer, the cylindrical frame of the turning louver is disposed turnably by leaving a gap between an outer peripheral surface of the cylindrical frame and an inner peripheral surface of the retainer, and in this state, a bezel is fitted to a front portion of the retainer.

* * * * *